(No Model.)

L. L. FUNK.
ELECTRIC MOUTH BATTERY.

No. 527,037. Patented Oct. 2, 1894.

Witnesses:
W. J. Jacker,
Flora L. Brown.

Inventor:
Levi L. Funk;
By Charles Turner Brown,
Atty.

UNITED STATES PATENT OFFICE.

LEVI L. FUNK, OF CHICAGO, ILLINOIS.

ELECTRIC MOUTH-BATTERY.

SPECIFICATION forming part of Letters Patent No. 527,037, dated October 2, 1894.

Application filed November 27, 1893. Serial No. 492,058. (No model.)

*To all whom it may concern:*

Be it known that I, LEVI L. FUNK, a resident of Chicago, in the county of Cook and State of Illinois, have invented certain new and useful Improvements in Electric Mouth-Batteries, of which the following, when taken in connection with the drawings accompanying and forming a part hereof, is a full and complete description.

The object of my invention is to obtain an electric battery which can be worn in the mouth, preferably in contact with the roof or palate thereof, and by means of which a primary electric current will be generated, the saliva or other moisture in the mouth serving as the excitant of such battery, and the circuit of such primary will be closed by the tongue, palate or gums forming one of the elements of such circuit.

Figure 1:
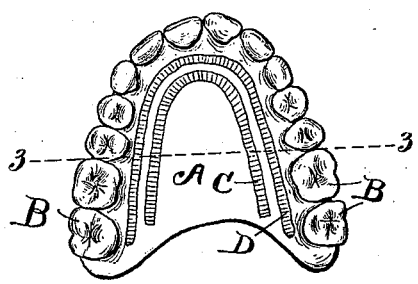
Figure 2:
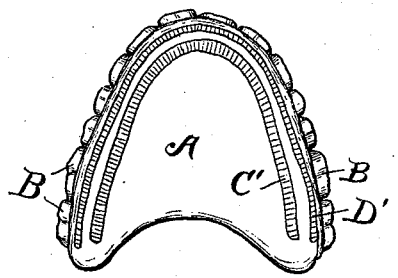
Figure 3:
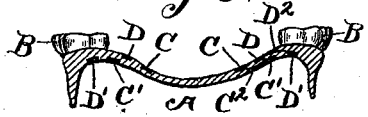
Figure 4:
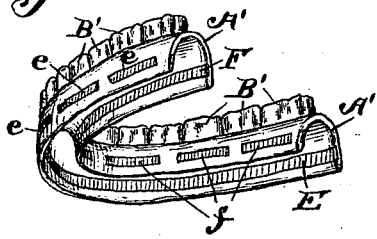
Figure 5:
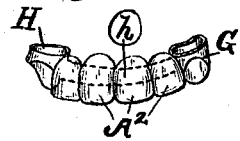
Figure 6:
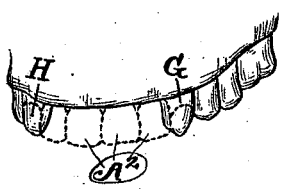
Figure 7:
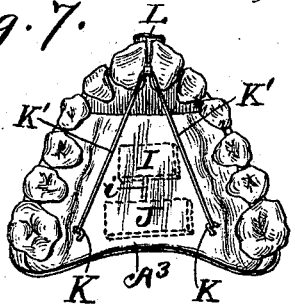

In the drawings referred to Figure 1 is a bottom plan view of an electric mouth battery embodying my invention, the base whereof forming a base on which are secured artificial teeth; Fig. 2, a top plan view of the electric mouth battery illustrated in Fig. 1; Fig. 3, a cross section thereof on line 3—3 of Fig. 1; Fig. 4, a modified construction of a device embodying my invention, and one adapted to be placed in the lower part of the mouth, with the base of the battery serving also as a base to which artificial teeth can be attached; Fig. 5, a perspective view of a still different construction of a mouth battery embodying my invention; Fig. 6, a perspective view of a portion of the upper jaw and teeth therein showing the manner in which the construction illustrated in Fig. 5 is secured in the mouth, such construction being indicated by dotted lines; Fig. 7, a modified construction of a device embodying my invention wherein the base of the battery forms a part of what is termed in the art of dentistry a regulator; and Fig. 8 a modified construction of a mouth battery embodying my invention and adapted to serve as a regulator, as it is termed.

The same letters of reference are used to indicate given parts where more than one view thereof is given.

A is a rubber plate conforming with sufficient closeness to the roof of the mouth of the person intending to wear my mouth battery so that the same will remain in place in the same manner as does the plate on which artificial teeth are ordinarily placed; and B are artificial teeth which may be secured, when desired, to plate A of the mouth battery.

It will be observed that while in many instances it will be found desirable and practical to place artificial teeth on the base of the mouth battery, thereby causing such base to serve as a plate base of such artificial teeth, yet it will not be understood that such teeth are essential to the successful working of the battery.

C is a strip of metal as say zinc embedded in base A, on one side or face thereof, and C' is a like strip of metal embedded in base A on the other side thereof.

$C^2$ is an electric conductor, of suitable metal, as say copper, connecting strip C to strip C'.

D is a strip of metal of opposite electric polarity, from strips C C', as say gold, embedded in plate A and not in electric contact with such strips C C'.

D' is a strip of metal of like electric polarity as is strip D, embedded in the base A on the opposite face thereof from such strip D, and $B^2$ is an electric conductor of suitable metal, as say copper, connecting strips D and D'.

It will be observed that the strip C may be connected to strip D if preferred, and strip C' to strip D'; but as such a connection in place of the one described, that is, strip C to strip C' and D to D' is a variation well known in the art of electric batteries, I have not illustrated it in the drawings.

In the modification illustrated in Fig. 4, E is a strip of metal as say zinc, having projections *e e* extending through the plate A' which is constructed preferably of rubber or other non electric conducting material, and F a metal strip of opposite electric polarity to strip E, as say gold, having projections *f f* extending through plate A'. B' B' are artificial teeth which may be, if desired, set in plate A.

In the modification illustrated in Figs. 5 and 6, G is a metal band and H a metal band of metal of opposite electric polarity to metal band G. One of such bands may be constructed of zinc and the other of gold. *h* is an electric conductor which may be constructed of a strip of copper, zinc or gold, connected to bands G, H. The conductor $h$ is preferably embedded in non-electric conducting material as say rubber, so as not to be in contact with the gums or other organs of the mouth of the person wearing this form of my invention. I have illustrated the teeth $A^2$ as secured to strip $h$, but such teeth are not essential to the working of the device, although where the natural teeth corresponding therewith of the person wearing this form of mouth battery are gone the plate $h$ extending between the bands G H is made to perform a double function when such teeth are attached thereto.

In the modification illustrated in Fig. 7 $A^3$ is a plate on non-conducting material, as say rubber; I, a metal plate, as say zinc, embedded in plate $A^3$ so that one face thereof is exposed to the action of the saliva or other liquid in the mouth of the person wearing the device; J, a metal plate of opposite electric polarity to plate I, as say zinc, also embedded in plate $A^3$ so that one face thereof is exposed, and $i$ is an electric conductor of say copper, zinc or gold connecting plates I J. The conductor is wholly embedded in plate $A^3$ so as not to be exposed to the action of saliva or other fluid in the mouth of the person wearing the device. K, K', L are devices not forming an essential part of the battery but indicating how the plate $A^3$ may be made to perform not alone the functions of a non-conducting base to my mouth battery but also the base for the apparatus constituting what is termed in the art a regulator.

Figure 8:
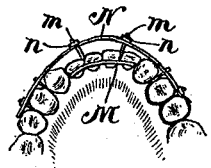

In the modification illustrated in Fig. 8 M is a metal plate of opposite electric polarity to plate N, as say gold, connected by conductors $m, m$, of say copper or gold. $n$ are nuts adapted to fit over conductors $m$ $m$ respectively, and by means of which the battery is secured in position as illustrated in the figure.

The mode of operation of the several devices is as follows: When the mouth battery constructed as illustrated in Figs. 1, 2 and 3 and described, is put in the mouth the plates C D come in contact with the palate of the wearer, and the plates C' D', (more or less frequently,) with the tongue. All of the plates are exposed to the action of the saliva and other liquids in the mouth and an electric action is induced. The palate and tongue forming a part of the circuit of the battery an electric action is received by the wearer.

The action in the modifications illustrated and described is the same as in the construction illustrated in Figs. 1, 2 and 3, that is, the several metal plates are exposed to the action of the saliva or other liquid in the mouth and thereby electrically excited and the palate, gums or tongue being elements constituting the closed circuit of the battery an electric action is obtained.

Where batteries embodying my invention are worn in the upper and lower part of the mouth; such batteries may be coupled together by conductor in the ordinary way of coupling batteries together.

Having thus described my invention, what I claim, and desire to secure by Letters Patent, is—

1. In an electric mouth battery the combination of metal plates of opposite electric polarity so disposed as to be exposed to excitation by the saliva or other fluids in the mouth, and that the organs of the mouth shall form elements of the circuit of the battery; conductors, not exposed to excitation by saliva or other fluids in the mouth, connecting the several plates, substantially as described.

2. In an electric mouth battery, the combination of a series consisting of more than one metal plate with a second series of metal plates of opposite electric polarity, conductors connecting the several plates, all of such plates disposed so as to be exposed to electrical excitation by the saliva or other fluid in the mouth of the wearer, such conductors disposed so as not to be exposed to such electrical excitation, and that the organs of the mouth will form elements in the circuit of the battery: substantially as described.

3. In an electric mouth battery the combination of a non-conducting plate adapted to fit in the mouth of a person, metal plates of opposite electric polarity embedded in the non-conducting plate, conductors connecting the metal plate, and embedded in the non-conducting plate, such metal plates so disposed as to be exposed to the action of an electric excitation by the saliva or other fluids in the mouth, and that the organs of the mouth shall form elements completing the circuit of the battery: substantially as described.

LEVI L. FUNK.

Witnesses:
CHARLES TURNER BROWN,
FLORA L. BROWN.